United States Patent
Lin et al.

(10) Patent No.: US 11,484,973 B2
(45) Date of Patent: Nov. 1, 2022

(54) LASER CLADDING SYSTEM AND METHOD

(71) Applicant: United Technologies Corporation, Farmington, CT (US)

(72) Inventors: Wangen Lin, S. Glastonbury, CT (US); Scott Lewis Boynton, East Windsor, CT (US); Alex Neese Brown, Windsor Locks, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 787 days.

(21) Appl. No.: 15/361,986

(22) Filed: Nov. 28, 2016

(65) Prior Publication Data

US 2018/0147667 A1    May 31, 2018

(51) Int. Cl.
*B23K 26/342* (2014.01)
*B23K 26/142* (2014.01)
(Continued)

(52) U.S. Cl.
CPC .......... *B23K 26/342* (2015.10); *B23K 26/032* (2013.01); *B23K 26/082* (2015.10);
(Continued)

(58) Field of Classification Search
CPC ............ B23K 26/0643; B23K 26/342; B23K 26/082; B23K 26/142; B23K 26/144;
(Continued)

(56) References Cited

U.S. PATENT DOCUMENTS

| 3,383,491 A | 5/1968 | Muncheryan |
| 5,097,110 A * | 3/1992 | Hamada ............. B23K 26/0643 |
| | | 219/121.63 |

(Continued)

FOREIGN PATENT DOCUMENTS

| CN | 204825050 U | 12/2015 |
| EP | 2711759 A1 | 3/2014 |
| JP | 2005040843 A | 2/2005 |

OTHER PUBLICATIONS

IP.com translation of Korean Patent Publication KR19990010317U, Published Mar. 15, 1999 (Year: 1999).*

(Continued)

*Primary Examiner* — Dana Ross
*Assistant Examiner* — Joseph W Iskra
(74) *Attorney, Agent, or Firm* — Kinney & Lange, P.A.

(57) ABSTRACT

A laser cladding head comprises a protective housing, a focal array, a turning mirror, and a powder nozzle. The housing extends along a primary axis from a proximal end to a distal end. The focal array is situated at the proximal end and oriented to receive and focus collimated light in a beam directed substantially along the primary axis. The turning mirror is situated at the distal end and disposed to redirect the beam in an emission direction, towards a target point separated from the turning mirror by a working distance of at most a tenth the focal length. The turning mirror is a nonfocal reflective surface indexable to alter an impingement location of the beam on the turning mirror. The powder nozzle is situated at the distal end and receives and directs weld material towards the target point for melting.

19 Claims, 6 Drawing Sheets

(51) Int. Cl.
*B23K 26/082* (2014.01)
*B23K 26/14* (2014.01)
*B23K 26/16* (2006.01)
*B23K 26/144* (2014.01)
*B23K 26/03* (2006.01)

(52) U.S. Cl.
CPC .......... *B23K 26/142* (2015.10); *B23K 26/144* (2015.10); *B23K 26/1476* (2013.01); *B23K 26/1488* (2013.01); *B23K 26/16* (2013.01)

(58) Field of Classification Search
CPC .............. B23K 26/032; B23K 26/1476; B23K 26/1488; B23K 26/16; F26B 17/20; F26B 3/347; H01M 8/247; Y02E 60/50; H05B 6/78; H05B 6/784
USPC ............ 219/121.63, 131.64, 131.83, 121.74, 219/121.75
See application file for complete search history.

(56) References Cited

U.S. PATENT DOCUMENTS

| | | | |
|---|---|---|---|
| 5,491,317 A | 2/1996 | Pirl | |
| 5,977,513 A | 11/1999 | Findlan | |
| 6,483,626 B2 | 11/2002 | Suga | |
| 7,038,161 B2 * | 5/2006 | Aubry | B23K 26/0665 219/121.63 |
| 7,696,452 B2 * | 4/2010 | Rippl | B23K 26/0884 219/121.61 |
| 8,394,168 B2 * | 3/2013 | Withers | B22F 3/008 75/10.18 |
| 8,927,897 B2 | 1/2015 | Xu et al. | |
| 9,737,961 B2 * | 8/2017 | Kell | B23K 26/0096 |
| 2004/0238504 A1 * | 12/2004 | Aubry | B23K 26/0665 219/121.63 |
| 2006/0042083 A1 | 3/2006 | Baker et al. | |
| 2006/0185473 A1 * | 8/2006 | Withers | B22F 3/008 75/10.13 |
| 2007/0062916 A1 * | 3/2007 | Rippl | B23K 26/0884 219/121.64 |
| 2007/0090097 A1 * | 4/2007 | Chen | B23K 26/032 219/121.63 |
| 2009/0291197 A1 * | 11/2009 | Bartels | B23K 26/02 427/8 |
| 2010/0292947 A1 * | 11/2010 | Buk | G01B 11/03 702/94 |
| 2011/0297083 A1 | 12/2011 | Bartels et al. | |
| 2012/0121382 A1 | 5/2012 | Xu et al. | |
| 2012/0261393 A1 | 10/2012 | Nowotny et al. | |
| 2014/0076864 A1 * | 3/2014 | Kell | B23K 26/0096 219/121.64 |
| 2018/0126489 A1 * | 5/2018 | Meyers | B23K 26/0096 |

OTHER PUBLICATIONS

Kugler GMBH, Kugler Laser Optics Catalog, 2010, p. 24 of 28 (Year: 2010).*
Extended European Search Report for EP Application No. 17203892.9, dated May 4, 2018, 9 pages.
Communication pursuant to Article 94(3) EPC for EP Application No. 17203892.9, dated May 7, 2021, 6 pages.

* cited by examiner

LASER CLADDING SYSTEM AND METHOD

BACKGROUND

Laser powder deposition is commonly used in manufacture and repair methods in the aerospace industry, particularly for large, high-value castings that are too crack sensitive to be welded via conventional processes. Laser cladding heads spray pulverant towards an area to be joined or repaired, while a laser beam (typically received via an optical fiber line) creates a small melt pool on the surface of the workpiece. This melt pool captures and incorporates some of the powder. Lasers in such systems can be tightly focused, enabling precise deposition of powder in a target area (e.g. along a weld seam, or to repair a crack or inclusion arising during manufacture or operation of a workpiece).

Common weld heads consist of two concentric hollow cones separated by a small gap. Metal powder, carried by an inert gas such as helium, exits between these cones and is focused on a target point of the workpiece. A laser is simultaneously focused at the same target point through the center of the inner cone. In these systems, conical powder jets are disposed coaxially about the laser beam, and additional inert gas is often directed substantially along the same axis to the molten puddle at the target point to protect from oxidation while powder is deposited.

Coaxial laser cladding heads are typically quite long (e.g. 500 mm or more), and are consequently unsuitable for applications where obstructions near the target point block access, such as when performing a weld within a pipe or other confined space. Some laser cladding heads used for these kinds of applications instead emit both beam and powder sideways from the end of a long wand that can be inserted between obstructions to access the workpiece and target point.

SUMMARY

In one aspect, the present invention is directed toward a laser cladding head configured to receive weld material from a powder source and collimated light from a laser source. The laser cladding head includes a protective housing, a focal array, a turning mirror, and a powder nozzle. The protective housing extends along a primary axis from a proximal end to a distal end. The focal array is situated at the proximal end within the protective housing and oriented to receive and focus the collimated light in a laser beam directed substantially along the primary axis, the focal array having a focal length. The turning mirror is situated at the distal end within the protective housing and disposed to redirect the laser beam in an emission direction transverse to the primary axis, towards a target point separated from the turning mirror by a working distance of at most a tenth the focal length, the turning mirror comprising a nonfocal reflective surface indexable to alter an impingement location of the laser beam on the turning mirror. The powder nozzle is situated at the distal end within the protective housing and configured to receive and direct the weld material towards the target point for melting by the laser beam.

In another aspect, the present invention is directed towards a method of operating a laser cladding system. A laser beam is focused along a primary axis using a focal array. Weld material is supplied by a powder nozzle to a target location offset from the primary axis by a working distance. The laser beam is redirected in an emission direction transverse to the primary axis by a nonfocal turning mirror, towards the target point. Failure conditions at the turning mirror are sensed, including conditions indicating fouling of or damage to the turning mirror. The turning mirror is indexed to change which portion of the turning mirror the laser beam impinges upon, without changing the emission direction.

The present summary is provided only by way of example, and not limitation. Other aspects of the present disclosure will be appreciated in view of the entirety of the present disclosure, including the entire text, claims, and accompanying figures.

Figure 1:
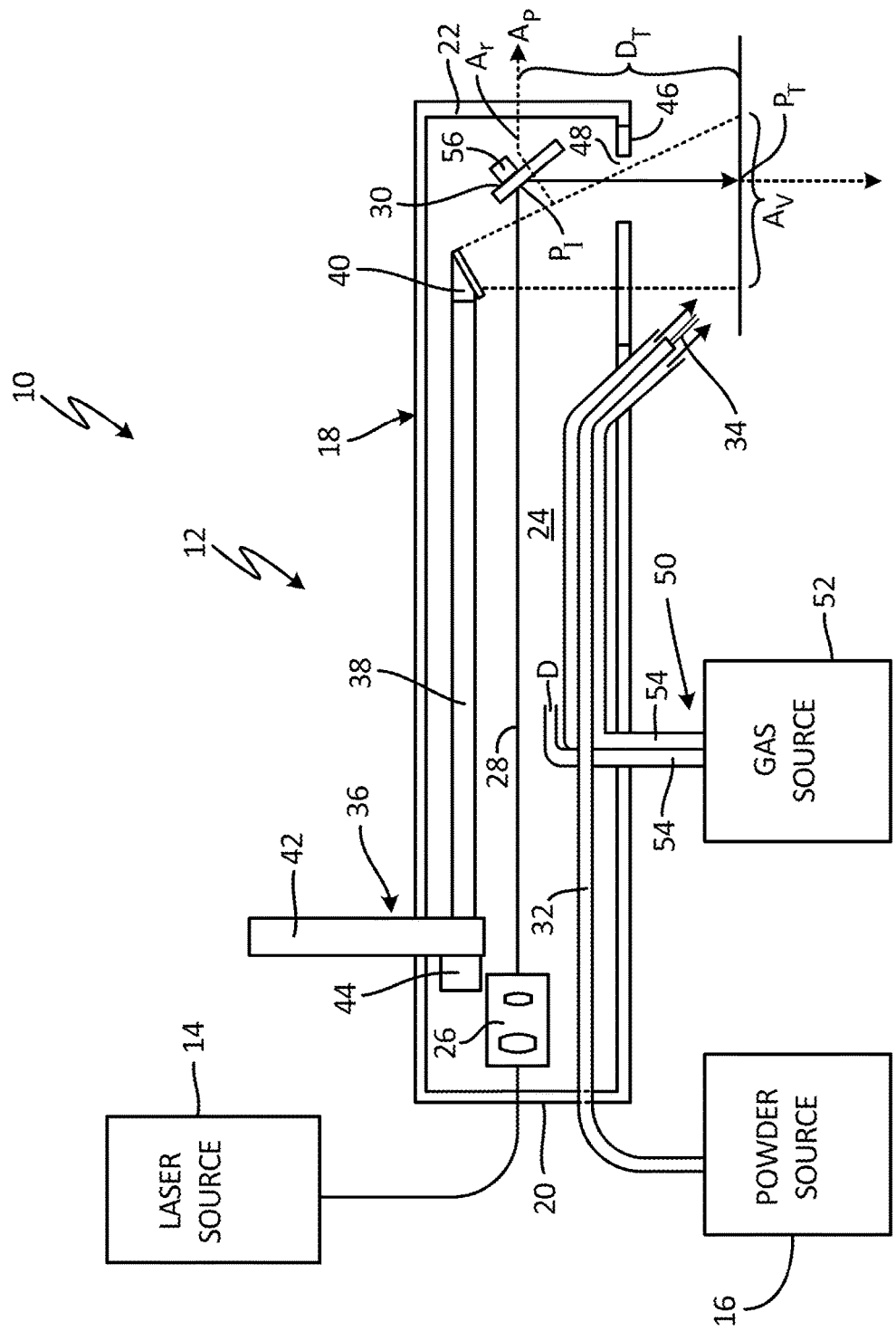
FIG. 1 is a schematic view of a laser cladding system with a laser cladding head.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention includes a laser cladding system with laser cladding head containing a long focal length focal array at a proximal end, and an indexable nonfocal turning mirror at a distal end. The focal array focuses a laser beam along a primary axis extending between proximal and distal ends of the cladding head. The turning mirror redirects the laser beam towards a target point a working distance away from the primary axis. Temperature sensors situated at the turning mirror can be used to detect fault conditions, and the turning mirror can be indexed by rotating it to expose a new portion of the turning mirror to impingement by the laser beam, thereby allowing the same turning mirror to be reused several times, despite sensed faults. The turning mirror can be protected by a high-speed gas sheath that deflects debris and weld spatter away from the mirror. A gas knife reduces a risk that this high-speed gas sheath interferes with the weld, while additional jets of inert gas coaxial with powder jets prevent oxidation of the molten weld by reducing local oxygen concentration. The high precision welds enabled by this system necessitate high-resolution imaging. A borescope situated along the primary axis and directed towards the target point is used to provide an improved image.

FIG. 1 is a schematic view of laser cladding system 10 with laser cladding head 12. Laser cladding head 12 receives collimated light from laser source 14 (e.g. via an optical fiber line) and weld material from powder source 16 (e.g. via a pressurized tube), and directs both weld material and focused, collimated light at target point $P_T$ to perform welds and other repair operations. Laser cladding head 12 includes protective housing 18, which extends along primary axis $A_P$ from proximal end 20 (near laser source 14 and powder source 16) and distal end 22 (near target point $P_T$). Protective housing 18 encloses interior space 24, which contains focal array 26, laser beam 28, turning mirror 30, powder line 32, powder nozzle 34, and borescope 38. Protective housing 18 can, for example, be a substantially cylindrical wand extending principally along primary axis $A_P$, and having a comparatively small diameter to enable access to target points situated in narrow or obstructed confines, e.g. within a tube or other enclosed workpiece.

Focal array 26 is a lens, mirror, or cluster of optical elements with focal length f, that focuses collimated light from laser source 14 along primary axis $A_P$. Collimated light forms beam 28, which extends across the majority of the axial length of laser cladding head 12 and impinges on turning mirror 30 at impingement point $P_I$. Turning mirror 30 is a nonfocal mirror that redirects beam 28 in emission direction $D_E$, transverse to primary axis $A_P$, towards target point $P_T$. Turning mirror 30 can, in one embodiment, be a flat, gold-plated copper mirror. Turning mirror 30 is oriented along and rotatably anchored at rotational axis $A_r$. Impingement point $P_I$ on turning mirror 30 is separated from working point $P_T$ by working distance $D_T$. By focusing beam 28 via focal array 26, rather than at turning mirror 30, the present invention is able to focus beam 28 over a long focal length f. In some embodiments, focal length f may be at least 400 mm or 450 mm. Focal length f is at least ten times working distance $D_T$, and in some embodiments at least thirty times working distance $D_T$. In at least some embodiments, working distance $D_T$ can be less than 20 mm. The long focal length f compared to working distance $D_T$ allows beam 28 to be directed transverse to primary axis $A_P$ (e.g. for weld operations in obstructed areas) without hypersensitivity to variation in working distance $D_T$. By pre-focusing beam 28 at focal array 26, near the proximal end of laser cladding head 12, focal length f can be substantially entire length of laser cladding head 12, or even slightly longer. Increased focal length f correspondingly allows increased tolerance to working distance $D_T$ (i.e. $\Delta D_T$), since $\Delta D_T \propto f$. Increased tolerance allows laser cladding system 10 to be substantially insensitive to minor variations in working distance $D_T$ that occur during normal weld operations. Focal array 26 and turning mirror 30 are described in greater detail below with respect to FIG. 2.

Powder source 16 provides weld material in the form of powder or pulverant metal via powder line 32. Weld material is supplied to target point $P_T$ via powder nozzle 34. Although only a single powder nozzle is illustrated in the present schematic view, embodiments of the present invention can include a plurality of distinct nozzles, e.g. symmetrically distributed with respect to target point $P_T$. Beam 28 heats target material, forming a molten pool in the vicinity of target point $P_T$ that incorporates weld material from powder nozzle 34.

Laser cladding system 10 also includes borescope 38. Borescope 38 includes borescope probe 38, imaging head 40, illumination source 42, and borescope camera 44, and is used to gather a high-resolution image of viewing area $A_v$ around target point $P_T$. Long focal length f permits reliably tight focus of laser beam 28 at target point $P_T$, enabling high precision welds. Increase in the size of the impingement area of beam 28 on target point $P_T$ due to the increased magnitude of focal length f can, in some embodiments, be compensated for by supplying collimated light from laser source 14 via a correspondingly lower-diameter optical fiber.

Borescope 38 facilitates high precision welds by providing the weld operator (whether human-controlled or automated) with correspondingly high resolution images of viewing area $A_v$, surrounding target point $P_T$. Borescope probe 38 extends parallel to primary axis $A_P$, from imaging head 40 to borescope camera 42. Imaging head 40 includes a mirror, prism, or array of mirrors and/or prisms directed at viewing area $A_v$, as well as a protective cover separating the interior of borescope 36 from interior space 24 of protective housing 18. In the illustrated embodiment, imaging head 40 is set back further than working distance $D_T$ from target point $P_T$, so as to minimize debris and weld backspatter on imaging head 40. Borescope probe 38 attaches to illumination source 42 and borescope camera 44. Illumination source 38 supplies light (e.g. white) for imaging of viewing area $A_v$, and can for example be an LED light source. Borescope camera 44 can for example be a charge-coupled device (CCD) camera used to guide laser cladding head 12. In at least some embodiments protective housing 18 includes imaging window 46, a transparent section of protective housing 18 between imaging head 40 and viewing area $A_v$. In the illustrated embodiment, beam 28 passes through aperture 48, a hole in protective housing 18 situated within imaging window 48. Borescope 36 is described in greater detail below with respect to FIGS. 3 and 4, while imaging window 46 and aperture 48 are discussed in greater detail with respect to FIG. 5. In at least some embodiments borescope 36 is oriented in a viewing direction not parallel to the path of beam 28 between turning mirror 30 and target point $P_T$. This non-parallel orientation prevents turning mirror 30 from occluding the view of borescope 36, and additionally facilitates beam targeting by allowing the operator to gauge working distance $D_T$ based on the location of the laser spot within viewing area $A_v$. In one embodiment, the viewing angle of borescope 36 is angled at 15-25° with respect to the emission angle of beam 28.

Laser cladding head 12 further includes gas system 50, which draws gas from gas source 52 through gas lines 54 to protect turning mirror 30 from debris and weld backspatter, and to exclude oxygenated air from the molten weld in the vicinity of target point $P_T$ so as to avoid weld material oxidation. FIG. 1 only provides a simplified view of a section of gas system 50; gas system 50 is described in greater detail and in non-schematic form below with respect to FIGS. 5-7. In some embodiments weld material may be delivered via powder nozzle 34 using an independent gas source separate from gas system 50. In general, powder nozzle 34 can use the same gas or gasses handled by gas system 50 to deliver weld material, or can use other inert gasses depending on specific need and cost. Gas system 50 can, in some embodiments, utilize several different gasses (e.g. Argon, Helium) to propel weld material, protect molten weld material from oxidation, and shield sensitive components (such as turning mirror 30) from damage and fouling.

In at least some embodiments laser cladding head 12 includes temperature sensor 56, a thermocouple or similar temperature sensor device situated within or adjacent turning mirror 30. Temperature sensor 56 is used to detect an out-of-bounds temperature or rate of change of temperature at turning mirror 30 corresponding to an unacceptable maintenance condition due to fouling or damage. Fouling or damage reduce the reflectiveness of turning mirror 30, causing an increase in its heating at impingement point $P_I$. Temperature sensor 56 senses this temperature increase, e.g. as an increase in thermocouple voltage beyond a specified voltage threshold or faster than a specified rate, allowing laser cladding system 10 to recognize imminent failure conditions necessitating indexing or replacement of turning mirror 30.

The present invention uses turning mirror 30, a nonfocal optical element rather than a focal lens, to redirect axially-aligned beam 28 toward target point $P_T$. Protective housing 18 and gas system 50 cooperate to protect turning mirror 30 from damage and fouling from its proximity to the weld operation at target point $P_T$, which can for example be as close as 15-20 mm away. Aperture 48 exposes only a small portion of turning mirror 30 around impingement point $P_I$ to potential weld backspatter and debris, allowing the remainder of turning mirror 30 to stay clean and undamaged even when protective housing 18 and gas system 50 are insufficient to entirely protect turning mirror 30. Turning mirror 30 can then be indexed by rotating about rotational axis $A_r$ to situate impingement point $P_I$ on a new, clean, undamaged portion of turning mirror 30 without causing any deviation in emission direction $D_E$ of beam 28. In at least some embodiments, the narrow focus of beam 28 at impingement point $P_I$ allows turning mirror 30 to be indexed at least five times in this fashion before no additional unused portion of turning mirror 30 is available. The present invention reduces operating expense not only by allowing turning mirror 30 to be reused through indexing, but by only situating turning mirror 30 proximate to the weld, rather than a more costly focal element such as focal array 26.

Figure 2:
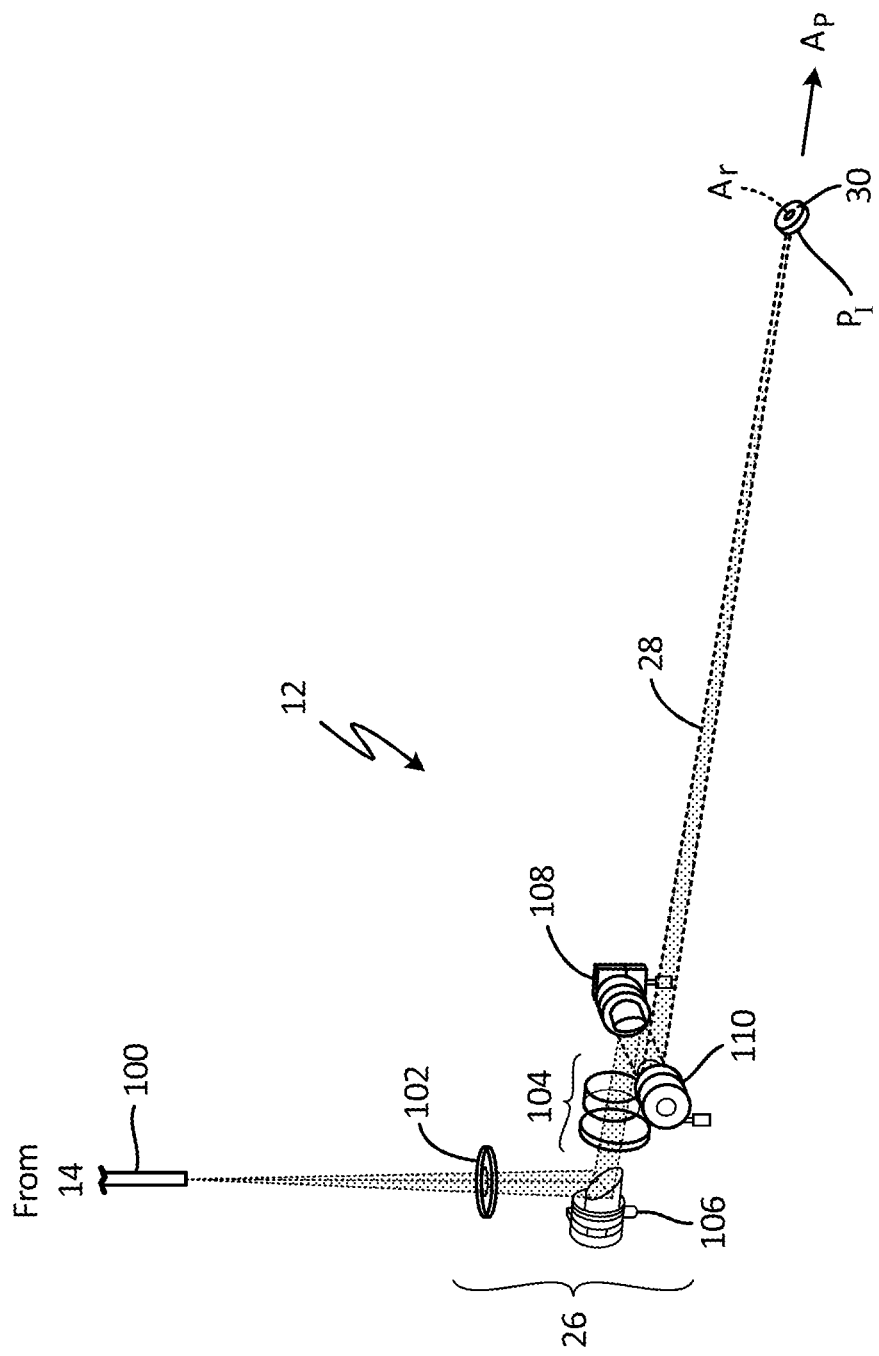
FIG. 2 is a perspective view of a laser optical path of the laser cladding head of FIG. 1

FIG. 2 is a perspective view of an optical path within laser cladding head 12, and illustrates focal array 26, beam 28, turning mirror 30, rotational axis $A_r$, impingement point $P_I$, target point $P_T$, optical fiber 100, collimator lens 102, objective lens doublet 104, and alignment mirrors 106, 108, and 110.

Optical fiber 100 carries collimated light from laser source 14 to focal array 26. Focal array 26 includes collimator lens 102, objective lens doublet 104, and alignment mirrors 106, 108, and 110. Collimator lens 102 collimates the output of optical fiber 100, and alignment mirrors 106, 108, and 110 cooperate to align the beam. Alignment mirrors 106, 108, and 110 can be responsible for different components of beam alignment, i.e. for alignment in orthogonal dimensions. Collectively, alignment mirrors 106, 108, and 110 align beam 28 along primary axis $A_P$, thereby determining impingement point $P_I$ on turning mirror 30 and target point $P_T$. In the illustrated embodiment, beam 28 is focused via objective lens doublet 104. More generally, focal array 26 can comprise any optical element or collection of elements that cooperate to align beam 28 with primary axis $A_P$ and focus beam 28 with focal length f. The full beam path of beam 28 from focal array 26 to target point $P_T$ has length substantially equal to focal length f, such that target point $P_T$ is aligned within a tolerance range $\Delta D_T$ of the adjusted focal point of beam 28. Tolerance range $\Delta D_T$ can, for example, be greater than 2 mm due to long focal length f.

Turning mirror 30 is rotatable about rotational axis $A_r$. Impingement point $P_I$ is offset from rotational axis $A_r$, such that for a given rotational alignment of turning mirror 30, only a small angular subset of turning mirror 30 is exposed to beam 28 and to the weld via aperture 48 (see FIG. 1). The size of turning mirror 30 determines the fractional angular subset of exposed mirror, with larger mirrors allowing a higher potential number of lifetime indexing operations.

Figure 3:
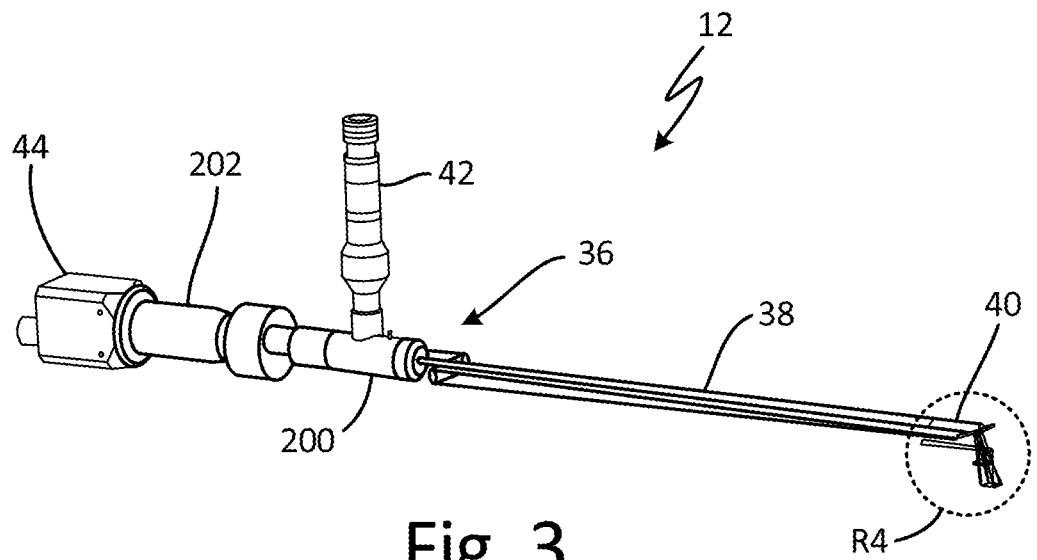
FIG. 3 is a perspective view of a borescope optical path of the laser cladding head of FIG. 1.
Figure 4:
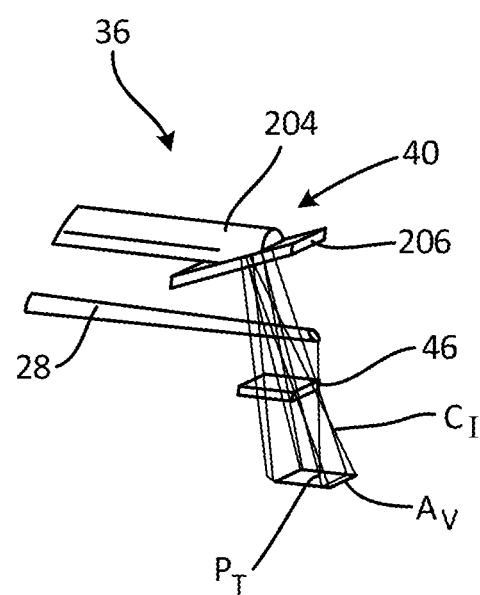
FIG. 4 is a close-up perspective view of a distal end of the borescope optical path of FIG. 3.

FIGS. 3 and 4 are perspective views of borescope 36 alongside beam 28. FIG. 3 illustrates borescope probe 38, imaging head 40 illumination source 42, borescope camera 44, borescope body 200, and camera adaptor 202, and delineates region R4 around imaging head 40 and target point $P_T$. FIG. 4 is a close-up of beam 28 and imaging head 40 of borescope 36, and illustrates borescope tip 204, cover 206, target point $P_T$, viewing area $A_v$, and image cone $C_I$.

As discussed above with respect to FIG. 1, borescope 36 includes borescope probe 38, illumination source 42, and borescope camera 44. Borescope body 200 receives and redirects imaging light such as white light from illumination source 42, and redirects this light along borescope probe 38 towards imaging head 40. Borescope body 200 also attaches to camera adaptor 202, which conditions the optical output of borescope head 44 for processing by borescope camera 44. As noted above, borescope camera 44 can be a CCD camera or other electronic camera used to align laser cladding head 12 with a desired weld location.

As illustrated in FIG. 4, imaging head 40 includes borescope tip 204 and cover 206. Borescope tip 104 is a mirrored input that defines illumination cone $C_I$ (the field of view of borescope 36), and thereby viewing area $A_v$. Borescope tip 204 is shielded by cover 206, which protects borescope tip 204 and screens undesired wavelengths to improve image quality and protect the borescope from thermal damage. Cover 206 can, for example, be formed of IR reflective glass.

Beam 28 can, for example have a width of 0.2-0.3 mm at target point $P_T$. In some embodiments, beam 28 is capable of impinging on the target point at a width less than 0.25 mm. Borescope 36 provides an image of sufficiently high resolution to permit precise alignment of beam 28 at target point $P_T$, e.g. a resolution dimension of one fifth the beam width at target point $P_T$, or smaller. Compared to imaging via beam-path optics, borescope 36 also provides a wider view of the surroundings of target point $P_T$, allowing target point $T_P$ to be more easily situated at a desired weld location.

Figure 5:
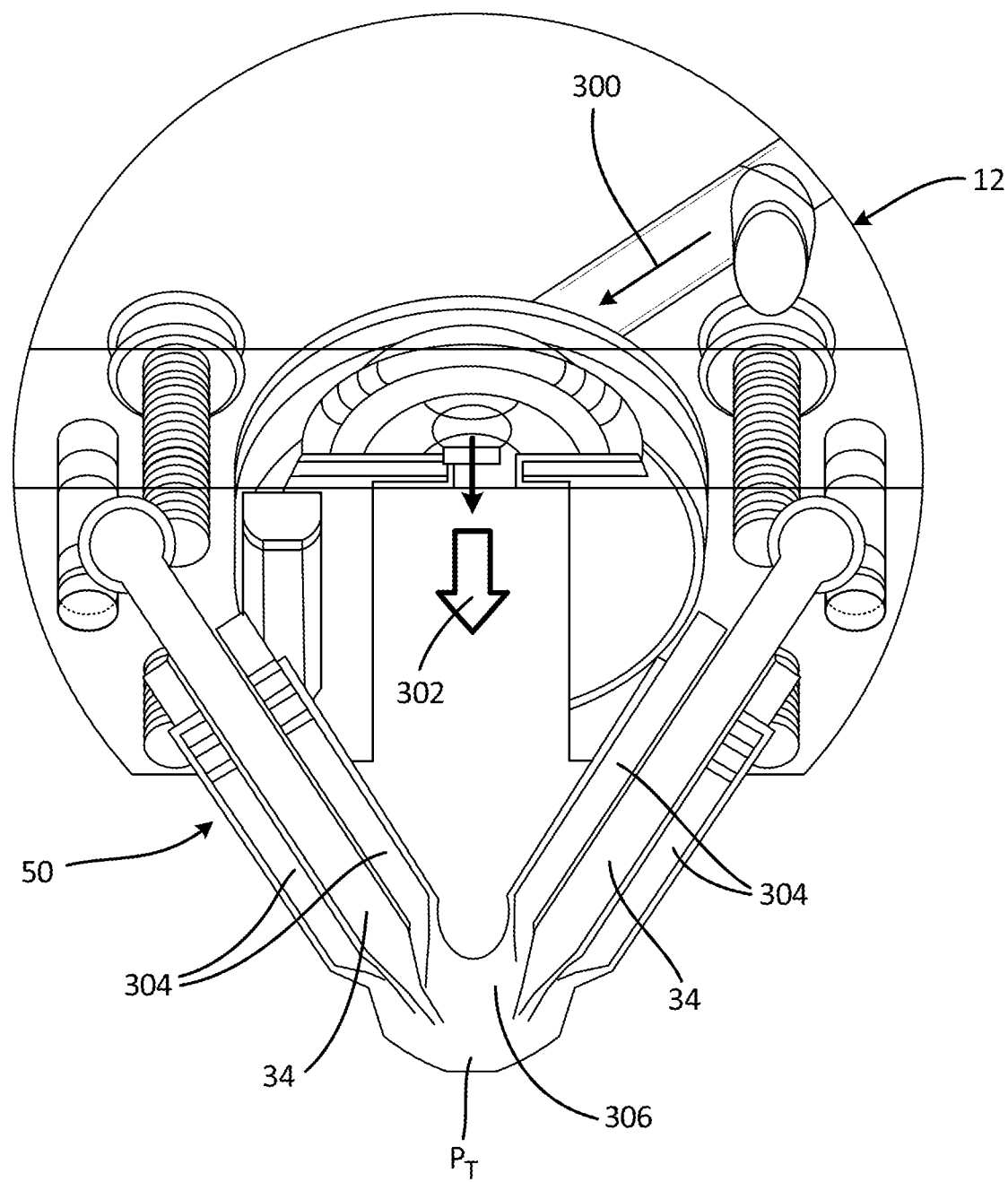
FIG. 5 is a transparent sectional view of the laser cladding head of FIG. 1 illustrating a portion of a protective gas system.

FIG. 5 is a transparent sectional view of laser cladding 12 illustrating a portion of a gas system 50. In particular FIG. 5 illustrates two symmetrically distributed powder nozzles 34, high-speed gas line 300, and coaxial nozzles 304 producing gas shield 306 in the vicinity of target point $P_T$. Gas sheath 302 is supplied primarily by gas flow coaxial with beam 28, injected into internal space 24 to protect lens array 26 and turning mirror 30.

As noted above, powder nozzles 34 supply gas-driven jets of pulverant weld material. Powder nozzles 34 can, for example, carry pulverant weld material on a stream of Helium, Argon, or other inert gas or gasses. Power nozzles 34 supply weld material to target point $P_T$ for incorporation in the molten weld. The weld can, however, give rise to both molten backspatter and flying debris in the form of uncaptured pulverant weld material. To prevent this material from impacting and damaging or fouling turning mirror 30, gas system 50 includes high-speed gas line 300, a high-speed gas outlet into interior space 24 (see FIG. 1) that can escape solely through aperture 48. As it escapes aperture 48, high-speed gas line 300 produces gas sheath 302, a pressurized gas jet that deflects debris and backspatter away from aperture 48. Gas sheath 302 can be expelled from aperture 48 towards target point $P_T$. The present invention can further include a gas knife (310; see FIG. 6, discussed below) that redirects gas sheath 302 away from target point $P_T$, thereby preventing gas sheath 302 from forming turbulent flow which may cause the weld being oxidized.

Coaxial nozzles 304 direct low-velocity inert gas towards the vicinity of target point $P_T$, producing gas shield 306. Coaxial nozzles 304 can, for example, carry argon gas from gas source 52. Gas shield 306 displaces or excludes oxygen from the immediate vicinity of the weld near target point $P_T$, thereby preventing oxidation of the molten weld material.

Figure 6:
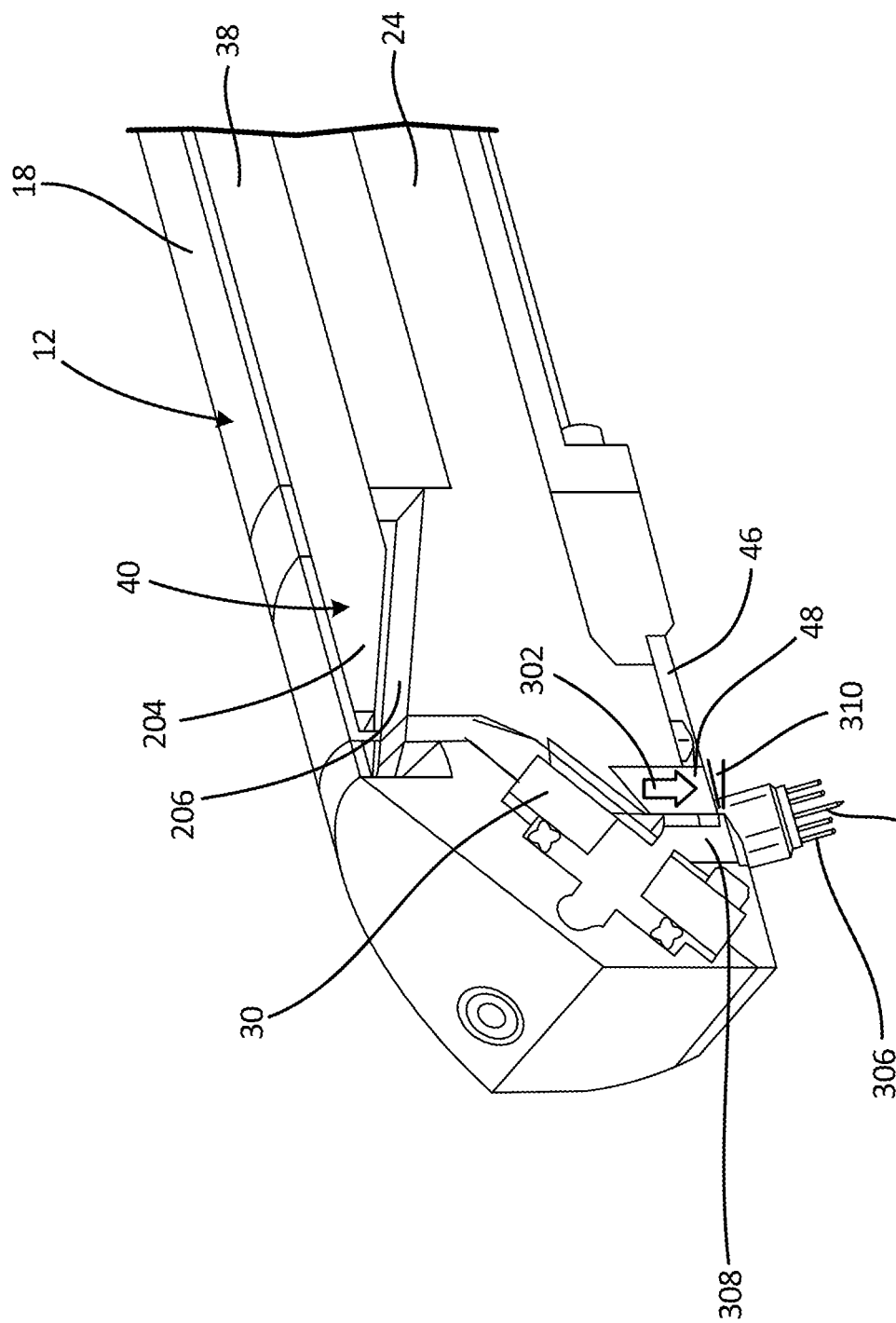
FIGS. 6 and 7 are cross-sectional perspective views of the laser cladding head of FIG. 1 illustrating flow paths of the gas system of FIG. 5.
Figure 7:
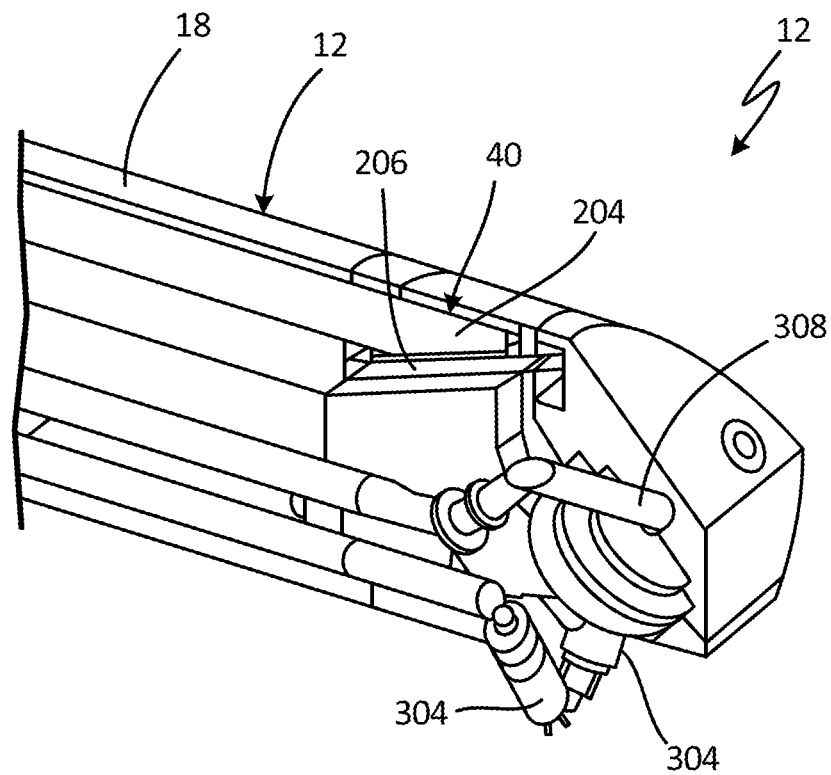

FIGS. 6 and 7 are cross-sectional perspective views of laser cladding head 12 along axial cross-sections, and illustrate protective housing 18, interior space 24, turning mirror 30, powder nozzle 34, imaging head 40 (with borescope tip 204 and cover 206 as described with respect to FIG. 3), imaging window 46 with aperture 48, and gas shield 306 all substantially as described above, as well as gas knife nozzle 308. FIG. 6 additionally illustrates gas sheath 302, gas knife nozzle 308, and gas knife 310.

As shown in FIG. 5, gas sheath 302 exits internal space 24 via aperture 48, coaxially with beam 28. A common gas inlet supplies high speed nozzle 300 and gas knife nozzle 308, while low-speed gas is passed near turning mirror 30 to provide protection and cooling. Gas flow within internal space 24 forms sheath flow 302 as it exits orifice 48. FIGS. 6 and 7 further illustrate the release of gas shield 306 coaxially with powder nozzle 34.

Gas knife nozzle 308 is routed through turning mirror 30 from behind, and directs inert gas, e.g. of the same type and from the same reservoir as high-speed nozzle 300, as gas knife 310. Gas knife 310 is a gas jet released laterally across viewing window 46, transverse to gas sheath 302, and serves to redirect gas sheath 302 away from target point $P_T$ so as to avoid interfering with welding. Gas knife 310 also serves to redirect any weld spatter and/or powder away from internal space 24 so as to prevent contamination of turning mirror 30. Laser cladding head 12 is capable of performing weld tasks in confined or obstructed areas. Due to the long focal length f of focal array 26, the weld beam of cladding head 12 is largely insensitive to small changes in working distance. Temperature probe 56 ensures that turning mirror 30 is indexed or replaced whenever damage or fouling impedes its performance, and gas system 50 protects turning mirror 30 without interfering with the weld at target point $P_T$. Gas system 50 additionally supplies the weld location with inert gas to prevent the weld from oxidizing.

Discussion of Possible Embodiments

The following are non-exclusive descriptions of possible embodiments of the present invention.

A laser cladding head configured to receive weld material from a powder source and collimated light from a laser source, the laser cladding head comprising: a protective housing extending along a primary axis from a proximal end to a distal end; a focal array situated at the proximal end within the protective housing and oriented to receive and focus the collimated light in a laser beam directed substantially along the primary axis, the focal array having a focal length; a turning mirror situated at the distal end within the protective housing and disposed to redirect the laser beam in an emission direction transverse to the primary axis, towards a target point separated from the turning mirror by a working distance of at most a tenth the focal length, the turning mirror comprising a nonfocal reflective surface indexable to alter an impingement location of the laser beam on the turning mirror; and a powder nozzle situated at the distal end within the protective housing and configured to receive and direct the weld material towards the target point for melting by the laser beam.

The laser cladding head of the preceding paragraph can optionally include, additionally and/or alternatively, any one or more of the following features, configurations and/or additional components:

A further embodiment of the foregoing laser cladding head, wherein the turning mirror is rotatably anchored within the laser cladding head about a central mirror axis, and wherein the impingement location is offset from the central mirror axis such that the mirror is indexed by rotating the turning mirror to expose a new impingement location.

A further embodiment of the foregoing laser cladding head, wherein the turning mirror is indexable at least five times by rotating the turning mirror to expose new regions of the turning mirror as the impingement location.

A further embodiment of the foregoing laser cladding head, wherein the protective housing has a beam outlet aligned with the impingement location so as to permit the redirected laser beam to leave the protective housing without exposing portions of the turning mirror other than the impingement location to debris and weld backspatter from the target point.

A further embodiment of the foregoing laser cladding head, wherein the turning mirror is a flat mirror.

A further embodiment of the foregoing laser cladding head, wherein the turning mirror formed of copper and plated with gold.

A further embodiment of the foregoing laser cladding head, further comprising: a temperature sensor disposed to sense changes in temperature of the turning mirror.

A further embodiment of the foregoing laser cladding head, wherein the temperature sensor is a thermocouple situated within or adjacent the turning mirror.

A further embodiment of the foregoing laser cladding head, wherein the focal length of the focal array is at least thirty times the working distance.

A further embodiment of the foregoing laser cladding head, wherein the laser beam is capable of impinging on the target point at a width less than 0.25 mm.

A further embodiment of the foregoing laser cladding head, further comprising a borescope extending along the primary axis, and having an imaging head at the distal end directed at the target point.

A further embodiment of the foregoing laser cladding head, wherein the imaging direction is angled between 15° and 25° with respect to the emission direction.

A further embodiment of the foregoing laser cladding head, further comprising a gas subsystem, the gas system comprising: a high-speed gas nozzle disposed near the turning mirror, and configured to produce a gas sheath coaxial with the laser beam in a region between the turning mirror and the target point, thereby shielding the turning mirror from debris and molten backspatter; and a gas knife disposed between the turning mirror and the target point, such that the gas knife redirects the gas sheath away from the target point.

A further embodiment of the foregoing laser cladding head, wherein the gas knife is a gas jet disposed substantially transverse to the gas sheath.

A further embodiment of the foregoing laser cladding head, wherein the gas subsystem further comprises a coaxial inert gas nozzle surrounding the powder nozzle, and directed towards the target point such that oxygen density in the vicinity of the target point is reduced.

A method of operating a laser cladding system, the method comprising: focusing a laser beam along a primary axis using a focal array; supplying weld material via a powder nozzle to a target location offset from the primary axis by a working distance; redirecting the laser beam in an emission direction transverse to the primary axis via a nonfocal turning mirror, towards the target point; sensing failure conditions at the turning mirror indicating fouling or damage to the turning mirror; and indexing the turning mirror to change which portion of the turning mirror the laser beam impinges upon, without changing the emission direction.

The method of the preceding paragraph can optionally include, additionally and/or alternatively, any one or more of the following features, configurations and/or additional components:

A further embodiment of the foregoing method, further comprising: deflecting debris and molten backspatter away from the turning mirror via a high-speed gas sheath.

A further embodiment of the foregoing method, wherein sensing failure conditions comprises detecting any out-of-bounds increase in temperature or rate of change in temperature at the turning mirror.

A further embodiment of the foregoing method, wherein detecting an out-of-bounds increase in temperature comprises sensing a temperature-correlated voltage above a failure threshold across a thermocouple disposed within or adjacent the turning mirror.

A further embodiment of the foregoing method, further comprising: performing at least one action from the group consisting of replacing, repairing, and cleaning the turning mirror after it has been indexed at least five times.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A laser cladding head configured to receive weld material from a powder source and collimated light from a laser source, the laser cladding head comprising:
   a protective housing extending principally along a primary axis from a proximal end to a distal end;
   a focal array situated at the proximal end within the protective housing and oriented to receive and focus the collimated light in a laser beam along the primary axis, the focal array having a focal length and a focal point, the focal array comprising a plurality of mirrors, the plurality of alignment mirrors comprising:
      a first alignment mirror disposed to redirect the collimated light from the laser source into a first path substantially parallel to the primary axis, and separated from the primary axis by a first distance;
      a second alignment mirror disposed to redirect the collimated light from the first alignment mirror from the first path into a second path directed at least partially radially inward relative to the primary axis; and
      a third alignment mirror disposed to redirect the collimated light from the second alignment mirror from the second path into a third path coincident with the primary axis;
   a turning mirror situated at the distal end within the protective housing and disposed to redirect the laser beam in an emission direction transverse to the primary axis, towards a target point separated from the turning mirror by a working distance, the turning mirror comprising a nonfocal reflective surface indexable to alter an impingement location of the laser beam on the turning mirror;
   a powder nozzle situated at the distal end within the protective housing and configured to receive and direct the weld material towards the target point for melting by the laser beam; and
   a borescope having a probe extending along a direction parallel to but not coincident with the primary axis from a borescope body to an imaging head located at a distal end of the borescope probe and directed at the target point, in an imaging direction not parallel to the emission direction,
   wherein the borescope probe is separated from the primary axis by a borescope distance, and from the first path by a distance greater than the borescope distance, and wherein the third path is situated axially with respect to the primary axis between the borescope body and the imaging head,
   wherein the focal length is at least ten times the working distance and wherein the working distance is within a tolerance of the focal point, and
   wherein multiple of the plurality of alignment mirrors are separately adjustable to determine separate dimensional components of alignment of the laser beam, such that the plurality of alignment mirrors collectively determines the impingement location.

2. The laser cladding head of claim 1, wherein the turning mirror is rotatably anchored within the laser cladding head about a central mirror axis, and wherein the impingement location is offset from the central mirror axis such that the mirror is indexed by rotating the turning mirror to expose a new impingement location.

3. The laser cladding head of claim 2, wherein the turning mirror is indexable at least five times by rotating the turning mirror to expose new regions of the turning mirror as the impingement location.

4. The laser cladding head of claim 1, wherein the protective housing has a beam outlet aligned with the impingement location so as to permit the redirected laser beam to leave the protective housing without exposing portions of the turning mirror other than the impingement location to debris and weld backspatter from the target point.

5. The laser cladding head of claim 1, wherein the turning mirror is a flat mirror formed of copper and plated with gold.

6. The laser cladding head of claim 1, further comprising:
   a temperature sensor disposed to sense changes in temperature of the turning mirror.

7. The laser cladding head of claim 6, wherein the temperature sensor is a thermocouple situated within or adjacent the turning mirror.

8. The laser cladding head of claim 1, wherein the focal length of the focal array is at least twenty times the working distance.

9. The laser cladding head of claim 1, wherein the laser beam is capable of impinging on the target point at a width less than 0.25 mm.

10. The laser cladding head of claim 1, wherein the imaging direction is angled between 15° and 25° with respect to the emission direction.

11. The laser cladding head of claim 1, further comprising a gas subsystem, the gas system comprising:
a high-speed gas nozzle disposed near the turning mirror, and configured to produce a gas sheath coaxial with the laser beam in a region between the turning mirror and the target point, thereby shielding the turning mirror from debris and molten backspatter; and
a gas knife disposed between the turning mirror and the target point, such that the gas knife redirects the gas sheath away from the target point.

12. The laser cladding head of claim 11, wherein the gas knife is a gas jet disposed substantially transverse to the gas sheath.

13. The laser cladding head of claim 11, wherein the gas subsystem further comprises a coaxial inert gas nozzle surrounding the powder nozzle, and directed towards the target point such that oxygen density in the vicinity of the target point is reduced.

14. A method of operating a laser cladding system having a borescope extending along a primary axis, the method comprising:
focusing a laser beam along the primary axis using a focal array, the focal array having a focal length of at least 400 mm and comprising a plurality of mirrors, the plurality of alignment mirrors comprising:
a first alignment mirror disposed to redirect the collimated light from the laser source into a first path substantially parallel to the primary axis;
a second alignment mirror disposed to redirect the collimated light from the first alignment mirror from the first path into a second path at least partially radially inward relative to the primary axis; and
a third alignment mirror disposed to redirect the collimated light from the second alignment mirror from the second path into a third path substantially coincident with the primary axis;
supplying weld material via a powder nozzle to a target location offset from the primary axis by a working distance;
imaging the target location with a borescope having a borescope probe extending along a direction parallel to but not coincident with the primary axis, from a borescope body to an imaging head located at a distal end of the borescope probe,
redirecting the laser beam in an emission direction transverse to the primary axis via a nonfocal turning mirror, towards the target point;
determining separate dimensional components of alignment of the laser beam via separate adjustment of multiple of the plurality of alignment mirrors, such that the plurality of alignment mirrors collectively determines the impingement location;
sensing failure conditions at the turning mirror indicating fouling or damage to the turning mirror; and
indexing the turning mirror to change which portion of the turning mirror the laser beam impinges upon, without changing the emission direction,
wherein the borescope probe is separated from the primary axis by a borescope distance, and from the first path by a distance greater than the borescope distance, and wherein the third path is situated axially with respect to the primary axis between the borescope body and the imaging head.

15. The method of claim 14, further comprising:
deflecting debris and molten backspatter away from the turning mirror via a high-speed gas sheath.

16. The method of claim 14, wherein sensing failure conditions comprises detecting any out-of-bounds increase in temperature or rate of change in temperature at the turning mirror.

17. The method of claim 16, wherein detecting an out-of-bounds increase in temperature comprises sensing a temperature-correlated voltage above a failure threshold across a thermocouple disposed within or adjacent the turning mirror.

18. The method of claim 14, further comprising:
performing at least one action from the group consisting of replacing, repairing, and cleaning the turning mirror after it has been indexed at least five times.

19. The laser cladding head of claim 1, wherein the focal array comprises a plurality of alignment mirrors configured to align the laser beam along the primary axis, thereby determining the impingement location on the turning mirror and the target point.

* * * * *